United States Patent
Fryman et al.

(10) Patent No.: US 8,533,436 B2
(45) Date of Patent: Sep. 10, 2013

(54) ADAPTIVELY HANDLING REMOTE ATOMIC EXECUTION BASED UPON CONTENTION PREDICTION

(75) Inventors: Joshua B. Fryman, Sunnyvale, CA (US); Edward T. Grochowski, San Jose, CA (US); Toni Juan, Barcelona (ES); Andrew Thomas Forsyth, Kirkland, WA (US); John Mejia, Hillsboro, OR (US); Ramacharan Sundararaman, Hillsboro, OR (US); Eric Sprangle, Austin, TX (US); Roger Espasa, Barcelona (ES); Ravi Rajwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 12/492,652

(22) Filed: Jun. 26, 2009

(65) Prior Publication Data

US 2010/0332801 A1 Dec. 30, 2010

(51) Int. Cl.
*G06F 15/00* (2006.01)
*G06F 9/30* (2006.01)
*G06F 9/40* (2006.01)

(52) U.S. Cl.
USPC .......................................... 712/219; 712/220

(58) Field of Classification Search
None
See application file for complete search history.

(56) References Cited

U.S. PATENT DOCUMENTS

| 5,161,227 A | 11/1992 | Dias et al. |
| 6,032,242 A | 2/2000 | Lin |
| 6,240,414 B1 | 5/2001 | Beizer et al. |
| 6,247,121 B1 | 6/2001 | Akkary et al. |
| 6,651,088 B1 | 11/2003 | Zhang et al. |
| 7,120,762 B2 | 10/2006 | Rajwar et al. |
| 7,243,356 B1 | 7/2007 | Saulpaugh et al. |
| 7,516,313 B2 | 4/2009 | Saha et al. |
| 2002/0078284 A1 | 6/2002 | McKenney |
| 2002/0199113 A1 | 12/2002 | Pfister et al. |
| 2003/0065704 A1 | 4/2003 | Buch |
| 2006/0004998 A1* | 1/2006 | Saha et al. ..................... 712/245 |
| 2006/0161738 A1* | 7/2006 | Saha et al. ..................... 711/150 |
| 2007/0124728 A1* | 5/2007 | Rosenbluth et al. .......... 718/100 |

FOREIGN PATENT DOCUMENTS

| CN | 1797348 A | 7/2006 |
| CN | 1973261 A | 5/2007 |
| CN | 101187862 A | 5/2008 |
| JP | 1999-161535 | 6/1999 |
| JP | 2004-504657 | 2/2004 |

OTHER PUBLICATIONS

Odaira, et al., "Selective Optimization of Locks of Runtime Statistics and Just-In-Time Compilation," Proceedings of International Parallel and Distributed Processing Symposium, 2003, IEEE, pp. 6, Apr. 2003.

(Continued)

*Primary Examiner* — Andrew Caldwell
*Assistant Examiner* — George Giroux
(74) *Attorney, Agent, or Firm* — Trop, Pruner & Hu, P.C.

(57) ABSTRACT

In one embodiment, a method includes receiving an instruction for decoding in a processor core and dynamically handling the instruction with one of multiple behaviors based on whether contention is predicted. If no contention is predicted, the instruction is executed in the core, and if contention is predicted data associated with the instruction is marshaled and sent to a selected remote agent for execution. Other embodiments are described and claimed.

20 Claims, 10 Drawing Sheets

(56) References Cited

OTHER PUBLICATIONS

Ravi Rajwar, et al., "Speculative Lock Elision: Enabling Highly Concurrent Multithreaded Execution," Dec. 3-5, 2001, pp. 1-12.

Korean Patent Office, Notice of Preliminary Rejection mailed Jul. 25, 2011 in Korean application No. 2010-0060789.

State Intellectual Property Office, P.R. China, Office Action and Search Report issued Jan. 4, 2013 in Chinese application No. 201010220346.4.

* cited by examiner

US 8,533,436 B2

ADAPTIVELY HANDLING REMOTE ATOMIC EXECUTION BASED UPON CONTENTION PREDICTION

BACKGROUND

In many instruction set architectures (ISAs), instructions are present to handle so-called atomic sequences. In an atomic sequence, an agent executes an operation on data in a manner that ensures that the agent has exclusive ownership of the data until the execution completes. Typically this can be implemented by a locking sequence in which a lock variable is associated with the data such that the agent first obtains exclusive access to the lock variable before accessing the data to be operated on to prevent other agents from accessing the corresponding data during the operation.

There are two typical methods for handling contended atomics, namely local operation or remote execution. The first method is fast for execution of the atomic operation, but has a high overhead cost due to cacheline bouncing and coherence, yielding a low bandwidth to the contended data. The second method has a poor latency for the atomic operation, but has a high bandwidth to the contended data.

On-die contention over atomic sequences (via critical regions or other constructs) is typically left to the programmer to manage explicitly. By careful instrumentation of the original program, granularity of atomic operations is reduced and contention may be minimized. However, such performance tuning efforts are not generally scalable from one class of machine to another. Furthermore, the careful instrumentation requires excessive attention by the programmer to develop code that accounts for atomic operations, which generally requires excessive programmer effort and does not scale well to different machines. For example, programmer-written code that may avoid contention in a processor having two cores may not scale very well to a many-core implementation in which many cores each of which can execute multiple threads are present.

DETAILED DESCRIPTION

In various embodiments, a transparent microarchitectural mechanism may dynamically detect and optimize contended atomic operations (such as a LOCK-prefixed instruction). Specifically, embodiments can adaptively switch between modes as locks undergo varying levels of contention throughout program execution, in a manner transparent to the programmer, operating system and instruction set architecture (ISA).

In one implementation, the following components may be used to realize dynamic lock operation: (i) a mechanism to dynamically recognize contended behavior based on predictions; (ii) a mechanism to switch during instruction decoding between contended/uncontended behavior for any given instruction to choose the most efficient execution; (iii) a mechanism to provide feedback to update the predictor system; and (iv) a mechanism for proxy-execution of atomic operations.

At the time of instruction decode, the program counter (EIP) can be used as a look-up value to a contention predictor. In one embodiment, the predictor may be a table that predicts whether the instruction's operation will be contended or not. In one implementation, a prediction may be presented for every instruction, but only certain instructions will use the prediction. As one example, in an Intel™ Architecture (IA) platform, these instructions may be LOCK-prefixed instructions such as exchange (xchg), exchange-add (xadd), increment (inc), and decrement (dec). To access the table, the EIP can be hashed to create an index into the predictor table and concatenated with hardware thread identifier (ID) bits, if the core supports more than one hardware context. This table will then be consulted to determine if the operation is expected to be contended or not.

Figure 1:
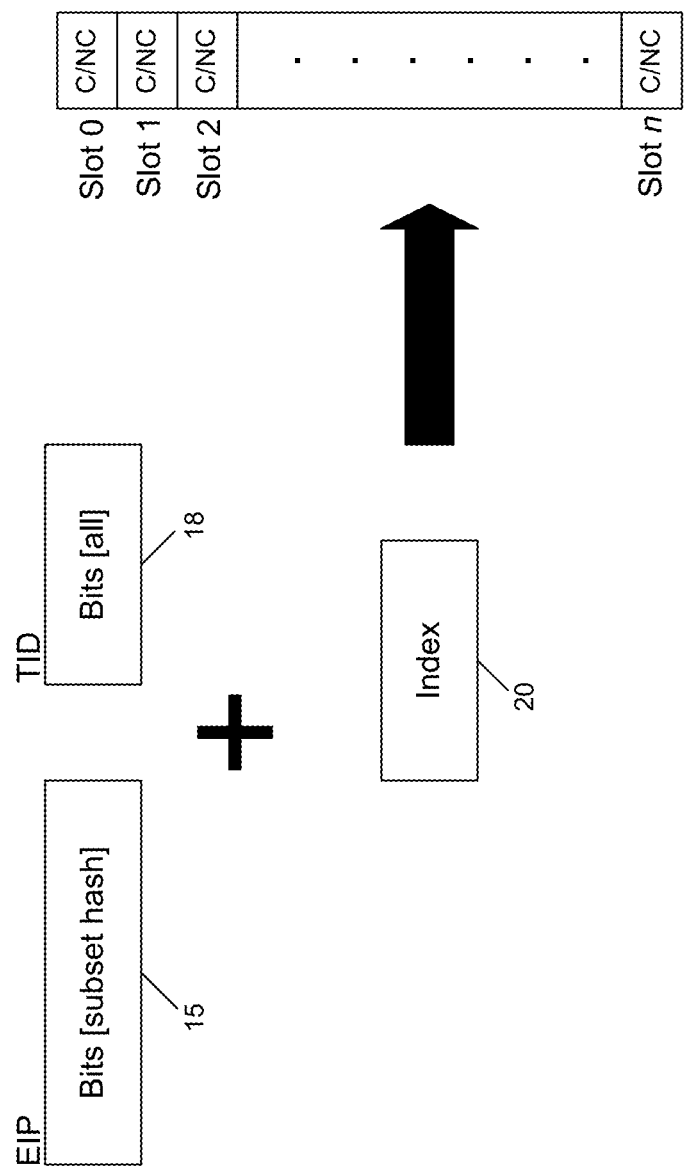
FIG. 1 is a block diagram of a predictor in accordance with one embodiment of the present invention.

Referring now to FIG. 1, shown is a block diagram of a predictor in accordance with one embodiment of the present invention. As shown in FIG. 1, a predictor 10 may take the form of a table that may be located in a dedicated storage of a cache memory associated with a processor core. In the embodiment of FIG. 1 predictor 10 may include a plurality of entries each to store one or more bits that provide a prediction. In one embodiment, each entry may store a single bit to indicate the presence or absence of contention (e.g., a set state to indicate contention and a reset state to indicate no contention). However in other embodiments, multiple bits may be present, with the most significant bit (MSB) indicating the prediction, and the other bits acting as a saturating counter. In the embodiment shown in FIG. 1 predictor 10 may be accessed using an index 20 that may be obtained by a concatenation of at least some bits of a program counter, which may be a subset of hashed bits of program counter 15, along with bits of a thread identifier 18, although other methods of indexing and accessing predictor 10 can be realized.

Based on a prediction provided by the predictor table, a core may handle the designated instruction in a given manner. In one embodiment, the prediction may be used to determine the appropriate instruction execution. For example, the prediction may steer micro-code programming (or an equivalent) used by the core in handling the instruction. Note that embodiments described herein are for a pipeline in which the instruction decoder determines which mode to use (and thus not having the address of the memory operand available). However, in other embodiments a pipeline may make the contended/not-contended decision later, e.g., in micro-code. In such embodiments, the predictor may be located later in the pipeline, rather than in the instruction decoder. Alternately, a pipeline may have the address of the operand, and include that value into the hash for the predictor table.

Figure 2:
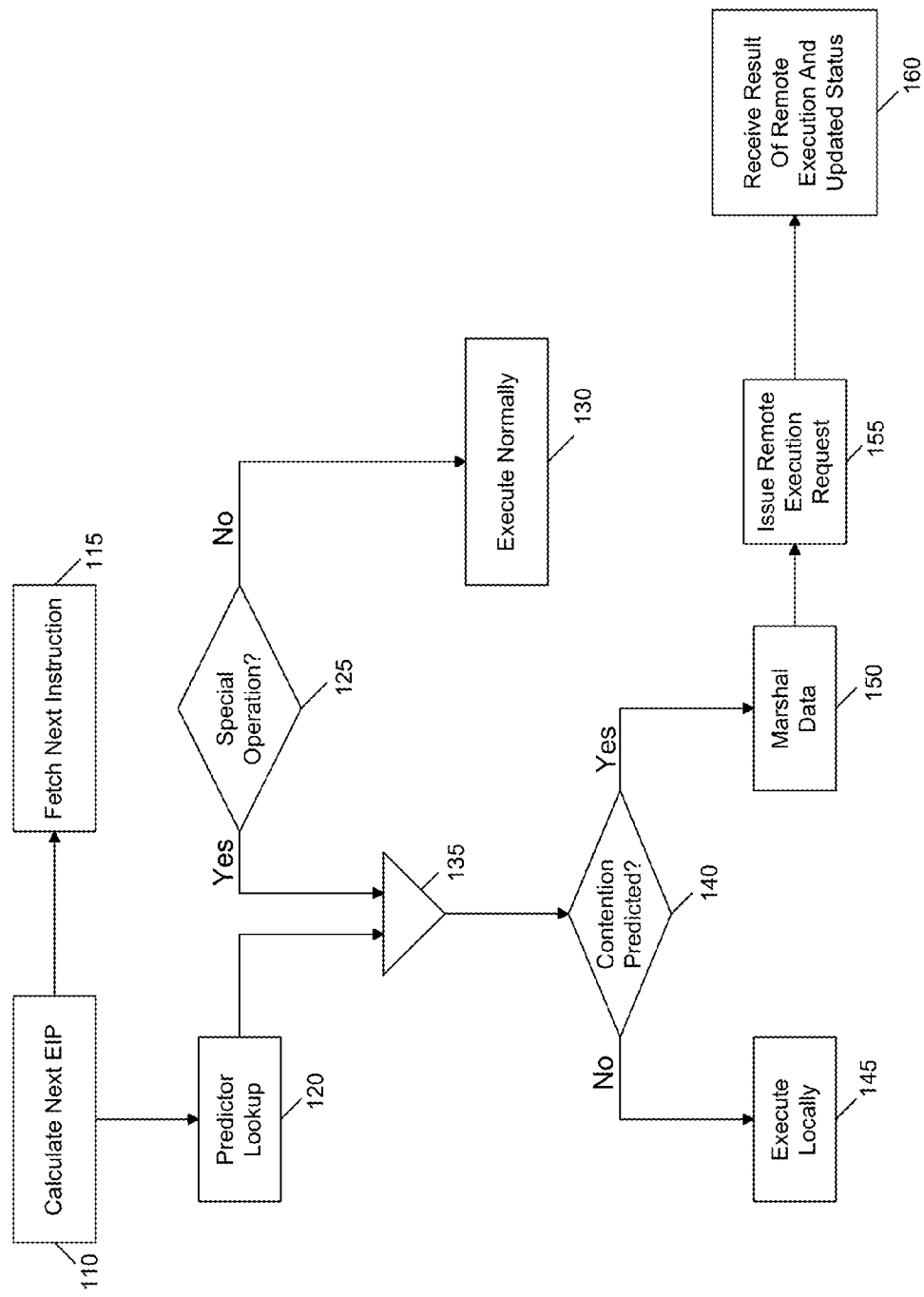
FIG. 2 is a flow diagram for handling an instruction based on a contention prediction in accordance with one embodiment of the present invention.

Referring now to FIG. 2, shown is a flow diagram for handling decoding of an instruction and switching between different instruction execution behaviors based on a contention prediction in accordance with one embodiment of the present invention. As shown in FIG. 2, method 100 may begin execution during decoding of an instruction in a core of a processor. As seen, method 100 may begin by calculating a next instruction pointer for a next instruction to be decoded (block 110). This next instruction may be fetched (block 115). For example, the instruction may be fetched from an instruction cache or the instruction may be obtained from a further portion of a memory hierarchy if not already present in the instruction cache. In parallel with fetching the instruction, a lookup of the predictor may also occur (block 120). Using the calculated EIP, an index may be generated and used to access the contention predictor to obtain the prediction for the corresponding instruction.

Referring still to FIG. 2, when the instruction is fetched, it may be determined during decode if the instruction is a predetermined type of operation (diamond 125). While the scope of the present invention is not limited in this regard, such operations may correspond to some or all LOCK-prefixed operations of an ISA. If the instruction is not of a predetermined type, the prediction information may be ignored and normal execution of the obtained instruction may occur (block 130). In the case of a no contention (NC) prediction, the decoder can prepare the microcode or micro-operations (uops) of the operation to be executed locally on the core as per existing ISA definition behavior of the instruction. Coherence engines such as cache controllers and so forth may be used to obtain data for execution of the instruction. Thus the instruction may be decoded, required sources for the instruction obtained, and the instruction can be executed and then retired.

Otherwise, when one of these special operations is encountered, control passes to block 135, where a concatenation between the fetched instruction (e.g., a LOCK-type instruction) and the prediction may occur. Then at diamond 140 it may be determined whether contention is predicted. This prediction may be based on the obtained output of the predictor. If no such contention is predicted, control passes to block 145, where the instruction may be executed locally, i.e., in the core that decodes the instructions. Such execution may be as described above.

If instead contention is predicted, control passes to block 150 where various data associated with the instruction may be marshaled. Thus when the predictor indicates expected contention, a different behavior is engaged. Instead of performing a local operation, the decoder engages an alternate path for instruction behavior. This alternate path gathers the local values required for the operation to be executed (marshaling the data). Then this marshaled data along with the instruction may be issued to a selected location for remote execution of the instruction (block 155). In one embodiment, this request may be a coherence protocol message type called a remote-atomic-execute (RAE) to send both the operation to be performed (e.g., xadd, inc, dec, xchg) and the marshaled data to a selected location for execution. Table 1 shows an example of a remote-atomic-execute message packet.

TABLE 1

| Operation | Address | Value 1 | Value 2 | EFLAGs | Padding |

As shown in Table 1 an RAE message packet may include various fields including an operation field that is the requested operation to be performed remotely, an address field associated with source data for the operation, multiple values, which may correspond to local data from the originating core that is marshaled for use in the operation, a flag field that may include flag information for use in connection with execution of the operation and which may be obtained from a control register of the originating core, and a padding field, which may include a number of pad bits to pad the message to a packet width. Of course other examples are possible.

In various embodiments, the selected location may vary. In some implementations the selected location may be a dedicated location for handling remote execution requests such as a dedicated core of a processor for such requests or logic associated with another component of a processor such as logic of a memory controller or directory. In yet other embodiments, the selected location may correspond to an owner core for source data for the instruction.

Finally, the originating core may receive a result of the remote execution (block 160). In addition, state information associated with the instruction including a prediction update may also be received. The originating core may update various registers, flags and so forth, along with a predictor update, based on this information. The operation results are thus returned by a remote node executing this operation as a proxy for the originating node, and additional status can be returned indicating whether the cacheline is/is not considered to be in contention. In the latter case, the local core updates its predictor table accordingly and future executions of the operation will occur with the non-contended behavior. While shown with this particular implementation in the embodiment of FIG. 2, the scope of the present invention is not limited in this regard.

Note that the remote execution can be treated on the originating core the same as a miss-to-cache, stalling the hardware context until the remote execution of the operation has completed and results have been returned. In one embodiment, a thread switch may be performed to enable another thread to make forward progress during this stall.

Accordingly, feedback can be used to keep the predictor table accurate. For systems that do not implement tag directories to track ownership, and instead rely on snooping behavior, tables used to provide oracle-level feedback can be implemented in each core. For systems that implement tag directories, tables used to provide feedback can reside in the tag directory/directories. To enable efficient operation, Read-For-Ownership (RFO) requests between store operations and LOCK-based operations can be distinguished. RFO-Lock operations that occur too frequently from multiple cores (not a single core) are an indication of contention in an atomic sequence. In one embodiment, a coherence controller may maintain a bit vector of which cores have exercised an RFO-Lock request or a RAE event over a given window of time. While the scope of the present invention is not limited in this regard, this window of time may be between approximately 500 and 1000 clock cycles of the processor.

Figure 3:
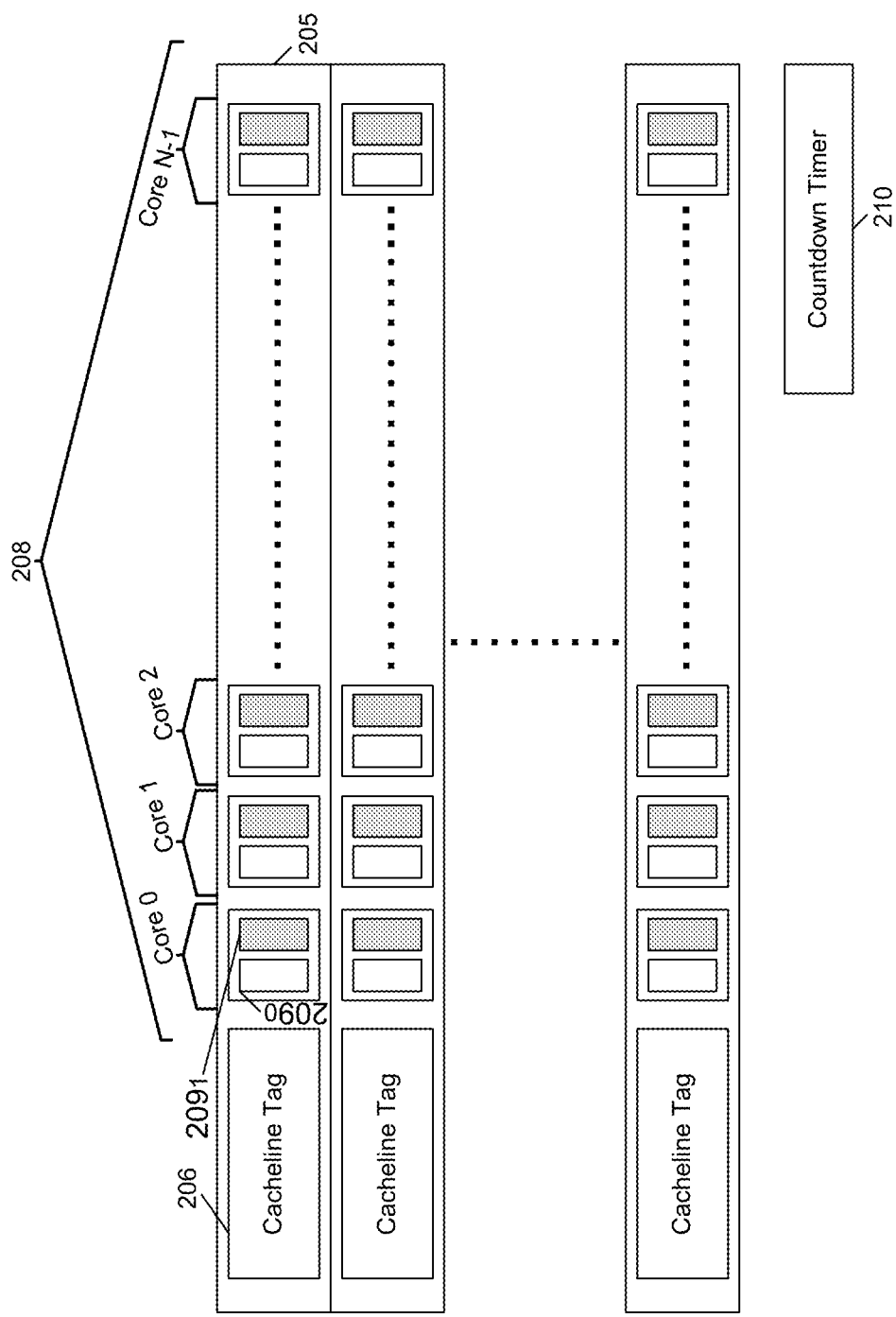
FIG. 3 is a block diagram of a contention tag vector in accordance with one embodiment of the present invention.

To provide hysteresis, a dual bit vector format can be used. In this implementation, every core in the system is represented for every cacheline by two bits in a contention vector: one for a "current" phase and one for a "previous" phase. Referring now to FIG. 3, shown is a block diagram of a contention vector in accordance with one embodiment of the present invention. As shown in FIG. 3, each cacheline may include an entry 205 in a directory 200. As seen, each entry includes a cacheline tag 206 and a contention vector 208. Within contention vector 208 each core may be represented by two bits, namely a first bit $209_0$ and a second bit $209_1$. In the embodiment shown in FIG. 3, bit $209_0$ may correspond to a current counting phase bit, while bit $209_1$ corresponds to a reset phase bit. During a first time period, every core that attempts to access a cacheline with an atomic operation will set the current counting phase bit $209_0$ for that core on that cacheline. Every clock tick, a timer, e.g., a global countdown timer 210 may be decremented by one, clamping at a zero-value without wrap-around. When timer 210 reaches zero, the 'reset phase' bits $209_1$ are cleared on every cacheline for every core. Then during a second time period the counting phase is set to the recently cleared bits, while the current counting phase is set to the opposite. In other words, during this next counting phase, cores seeking to perform an atomic operation will cause a setting of bits $209_1$, rather than bits $209_0$. By using this alternating two-bit reset scheme, contention history is maintained while the window of observing program behavior is limited to twice the countdown timer value, allowing dynamic adaptation.

Whenever more than one core has a non-zero count in an entry, contention feedback is provided. When looking up a cacheline, each core's two-bit values $209_0$ and $209_1$ are logically OR'd together to represent whether that core has requested that cacheline for atomic use in the recent history. If more than one core has made such a request during the historical window, then the cacheline corresponding to the entry is predicted as contended, otherwise it is predicted as non-contended.

To accurately reflect contention, every RFO-Lock and RAE message is sent to a state machine logging this history, which may be present in the directory. The originator node will expect a predictor feedback response message, and will update its local predictor table appropriately. In one embodiment, this update occurs by the originating core having stored all in-flight RFO-Lock/RAE operations in a table that can be accessed using the originating program counter (EIP) and ring message sequence number. When the corresponding response-feedback sequence number returns, the EIP will again be used as an index to the predictor table. When the feedback is for a contended prediction, the predictor table will be set to a logic one value, corresponding to a C prediction otherwise, the value is set to zero to indicate NC.

In the case where the originating node for the RFO-Lock or RAE operation has generated the wrong type of request (e.g., expecting NC but is C), the response feedback will indicate to the originating core to re-play the original instruction with the correct operation. That is, if the originating node sent an RFO-Lock expecting uncontended behavior, the feedback would indicate to the originating node both to update the local predictor table, and re-issue/re-play the instruction as contended, which would send the revised RAE request to the proxy agent during re-play. Such re-play may be performed because the RFO-Lock carries insufficient information to immediately proxy-execute the lock operation by forwarding, and the RAE request cannot handle a cacheline move back to the originating core, in some embodiments. However other embodiments may merge the RFO-Lock and RAE messages to carry sufficient semantics to effect a re-play. In the case of a mispredict in which C is expected but the line in fact is NC, the remote proxy execution will be carried out normally but the feedback for the predictor will return with NC to enable updating of the local predictor table.

In the case of a contended atomic execution behavior, the owner/tag directory will forward the marshaled data to the selected location that should have the target cacheline in the appropriate modified (M) or exclusive (E) state. This remote node will then execute, e.g., in a dedicated arithmetic logic unit (ALU) the requested operation, returning the appropriate values and/or condition flags to the originating node as well as a predictor correctness update.

Figure 4A:
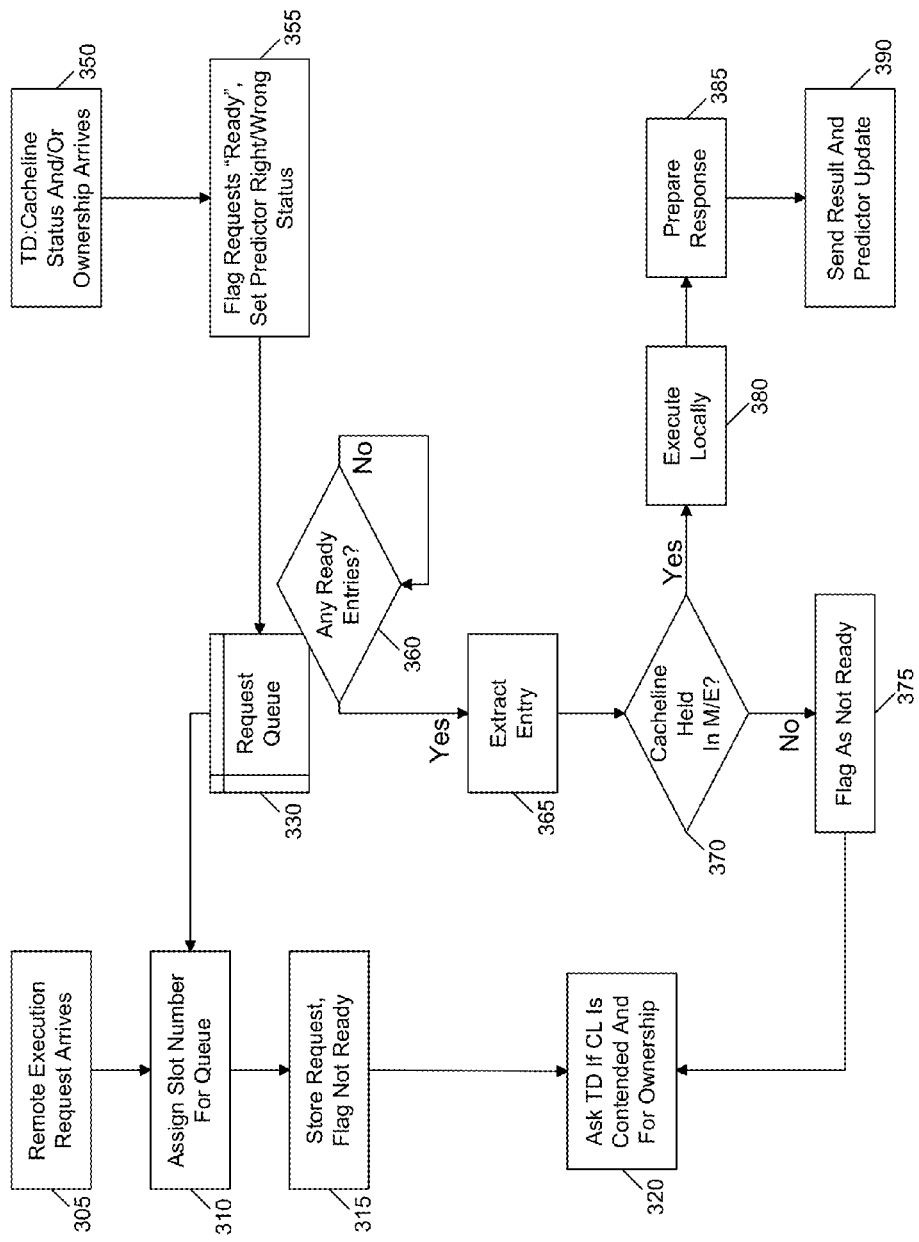
FIG. 4A is a flow diagram for handling remote execution of an operation in accordance with an embodiment of the present invention.

Referring now to FIG. 4A, shown is a flow diagram for handling proxy execution of operations in accordance with an embodiment of the present invention. As described, remote execution may be performed in various locations such as a dedicated core, memory controller, or a core associated with data to be used in the remote execution operation. FIG. 4A is directed to an implementation in which the remote execution occurs in a memory controller. As seen, two different entry points are present in the method. At entry point 305, a remote execution request arrives. This request may be received directly from an originating node, e.g., an originating core. A slot number may be assigned for this request in a request queue 330 (block 310). Accordingly, this request may be stored in the request queue with a flag indicating that it is not ready for execution (block 315). To determine whether a cacheline associated with the operation is contended and to request ownership of the cacheline, block 320 is executed.

As further seen in FIG. 4A, another entry into method 300 may be via the tag directory when an update to a cacheline status and/or a request for ownership arrives (block 350). When such request corresponds to the remote execution request, the directory may flag the request as ready and furthermore set a predictor status that is also present in the corresponding entry of request queue 330 (block 355).

As further seen in FIG. 4A, the entries of request queue 330 may be accessed to determine whether any entries are ready (diamond 360). Such ready determination may be based on this ready flag status. If a request is ready, the corresponding entry may be extracted (block 365) and it may be determined whether the cacheline associated with the request is held in a modified or exclusive state (diamond 370). If not, the entry may then be flagged as not ready, as this indicates that the memory controller is not the correct owner of the cacheline. Accordingly, control passes back to block 320 to seek ownership of the cacheline. In this manner, the operation may be replayed when the tag directory provides the updated ownership status via block 350.

Referring still to FIG. 4A, if instead it is determined at diamond 370 that the cacheline is in a modified or exclusive state, control passes to block 380 where the request may be executed locally. That is, the request may be executed based on the information received with the remote execution request along with the data obtained from the cacheline. Then the memory controller may prepare a response, where the response includes both the result and update for the predictor associated with the originating node (block 385). This response may then be sent at block 390. While shown with this particular implementation in the embodiment of FIG. 4A, the scope of the present invention is not limited in this regard.

Thus in the case of a correct prediction (C or NC), the proper behavior is executed. If instead a mispredict occurs that indicates expected contended behavior when it should not be, the originating core will recover during the execution of this operation. The originating core will generate a request to the cacheline owner for remote-atomic-execution. The remote agent will automatically verify whether the cacheline is still in contention, collecting the directory's predictor feedback. With the response from the directory, the agent will then execute the requested operation. The remote agent provides a directory feedback response to the originating core with the results (and flags) of the operation.

If a mispredict occurs that indicates NC when the operation should be contended, then one of three scenarios will happen: (a) the cacheline exists locally in an M or E state; (b) the cacheline exists locally in a shared (S) state; or (c) the cacheline is not resident locally to this core. In the case of (a), this core is the de facto owner of the data, and the atomic operation can be executed locally with no perturbation of the system or other cores. In the case of (b), when this core sends an RFO-Lock request to the owner/tag directory, a feedback will come back with a Contended status and a re-play of the operation will be done with the contended path (of FIG. 2) being executed. In the case of (c), when an RFO-Lock request is generated to bring the cacheline into the core, the same sequence of feedback and replay as in (b) will occur.

In embodiments in which remote execution behavior is handled inside a memory controller (MC), a coherence protocol may support the MC. Further, the MC may include a local cache, ALUs, and state machines. To avoid a race condition where multiple cores are competing over remote execution while cache line bouncing can occur, additional information may be associated with tag directory entries. Specifically, the tag directory may include a state bit on each cache line tag to indicate that remote execution operations are in flight for that cache line. When a core requests a remote execution on a cache line, it will generate a "Who Owns CL<addr>" with the RFO-Lock message to the tag directory. The tag directory then sets the "RemoteExecInFlight" indicator in the tag portion of the entry and responds with the current cache line owner of that requested cache line. The originating core will then directly request the owner core to perform the RAE to carry out the operation and reply to the requesting core with the proper result. The requesting core, upon receiving the result from the cache line owner, will then notify the tag directory that RAE has been serviced. In one embodiment, the tag directory can allow multiple RAE requests to be in flight concurrently (tracking a count of how many are pending), until a non-RFO-Lock (remote execution) request arrives for the same cache line. Upon receiving such a request, all requests arriving thereafter are prevented until the in-flight remote execution events drain from the system. Execution then resumes in order from the new, non-RFO-Lock operation.

A secondary, minor race condition is possible in that between the time that an originating core requests "Who Owns CL<addr>" and the RAE is able to reach this owner reported by the tag directory, that owner may have evicted the cache line from its cache hierarchy. To resolve this condition, in one embodiment an extra hop may be added in the communication path. That is, the tag directory notifies the current owner that a remote execution request is going to arrive. It will wait for that notification to be acknowledged, before it replies to the requesting core who the owner is. During the time between this "impending remote execution" message and the actual RAE message, the current owner cannot evict the target cacheline.

Figure 4B:
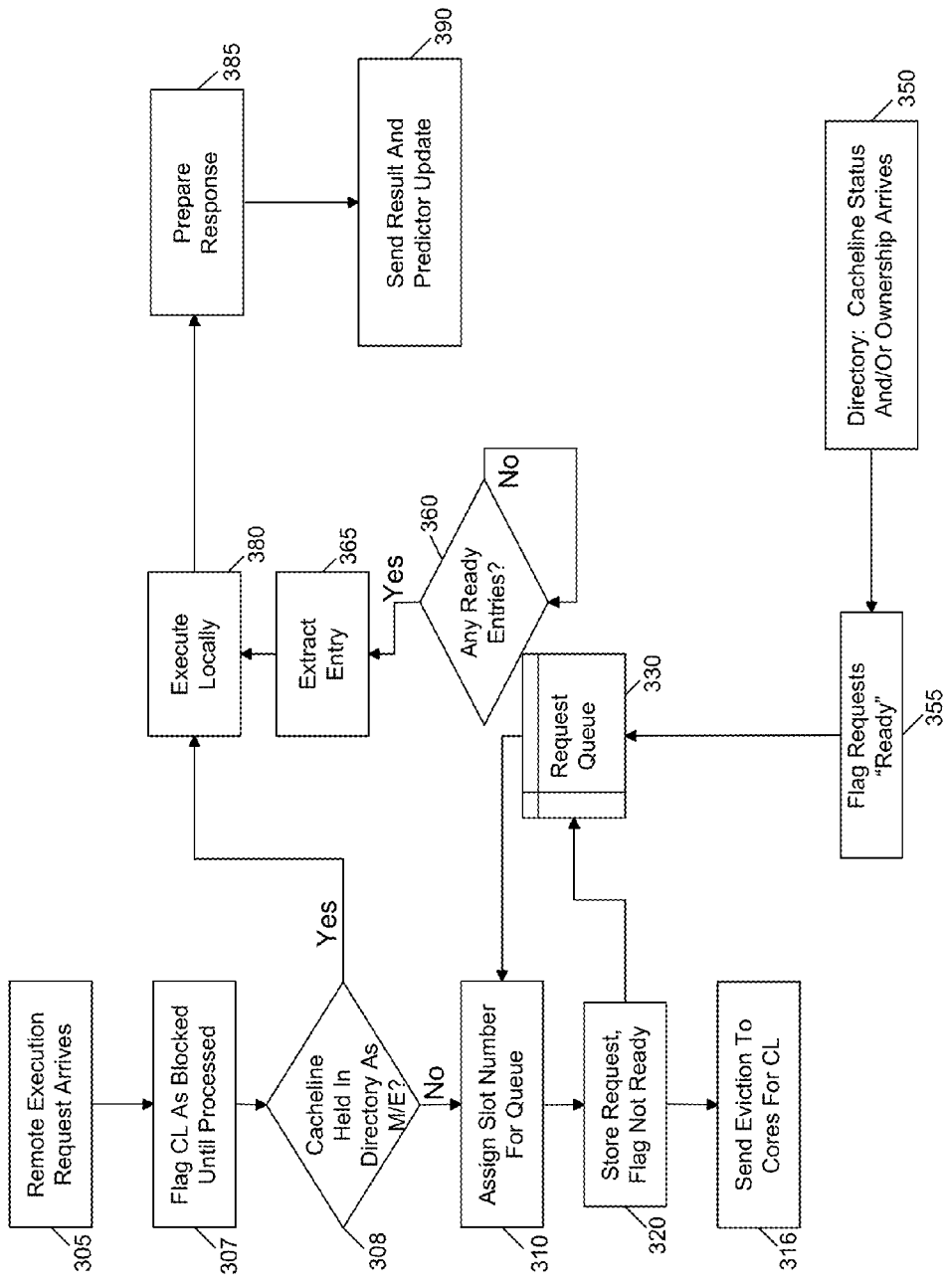
FIG. 4B is a flow diagram for handling remote execution in a directory in accordance with one embodiment of the present invention.

Referring now to FIG. 4B, shown is a flow diagram for handling remote execution in a directory in accordance with one embodiment of the present invention. In general, the flow may be similar to that described above with regard to FIG. 4A. However, various changes in the processing of method 301 are seen. Specifically, upon receipt of a remote execution request, the directory may flag the corresponding cacheline as blocked until the remote request is processed, e.g., via a in-flight indicator of a tag portion of a directory entry (block 307). Next, the directory may determine whether the cache line is held in the directory in a modified/exclusive state (diamond 308). If not, the flow discussed above with regard to FIG. 4A as to assigning a slot and storing a request within a request queue is performed. Still further as seen in block 316, the directory may send an eviction to any cores holding the corresponding cacheline (block 316). In other respects, with regard to receiving status information and/or ownership back in the directory and the operations performed to flag the request as ready and to locally execute the request, prepare a response and send the results along with a prediction update, may occur as discussed above with regard to FIG. 4A.

Figure 4C:
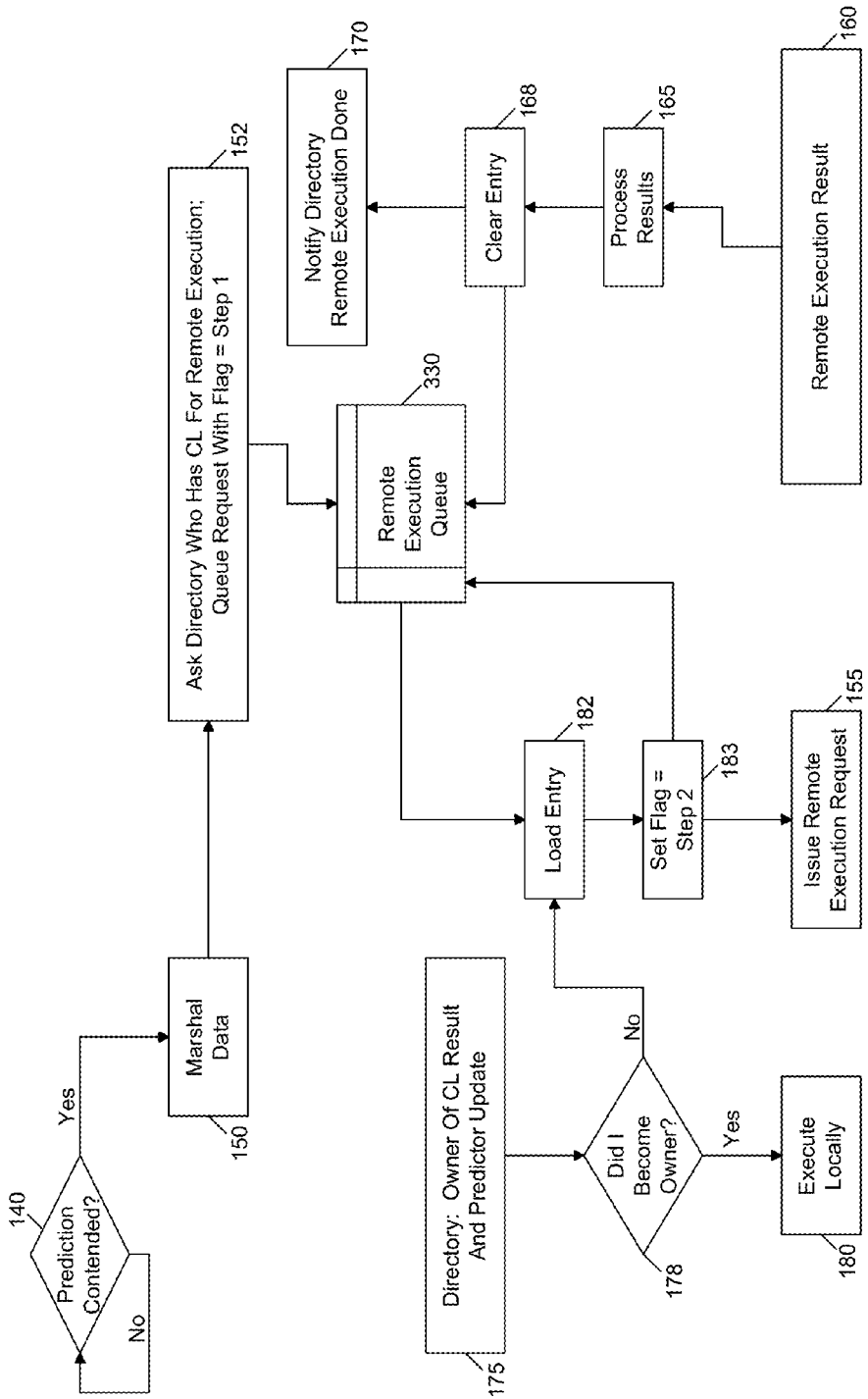
FIGS. 4C-4E illustrate flow diagrams for handling remote execution in an owner core in accordance with one embodiment of the present invention.
Figure 4D:
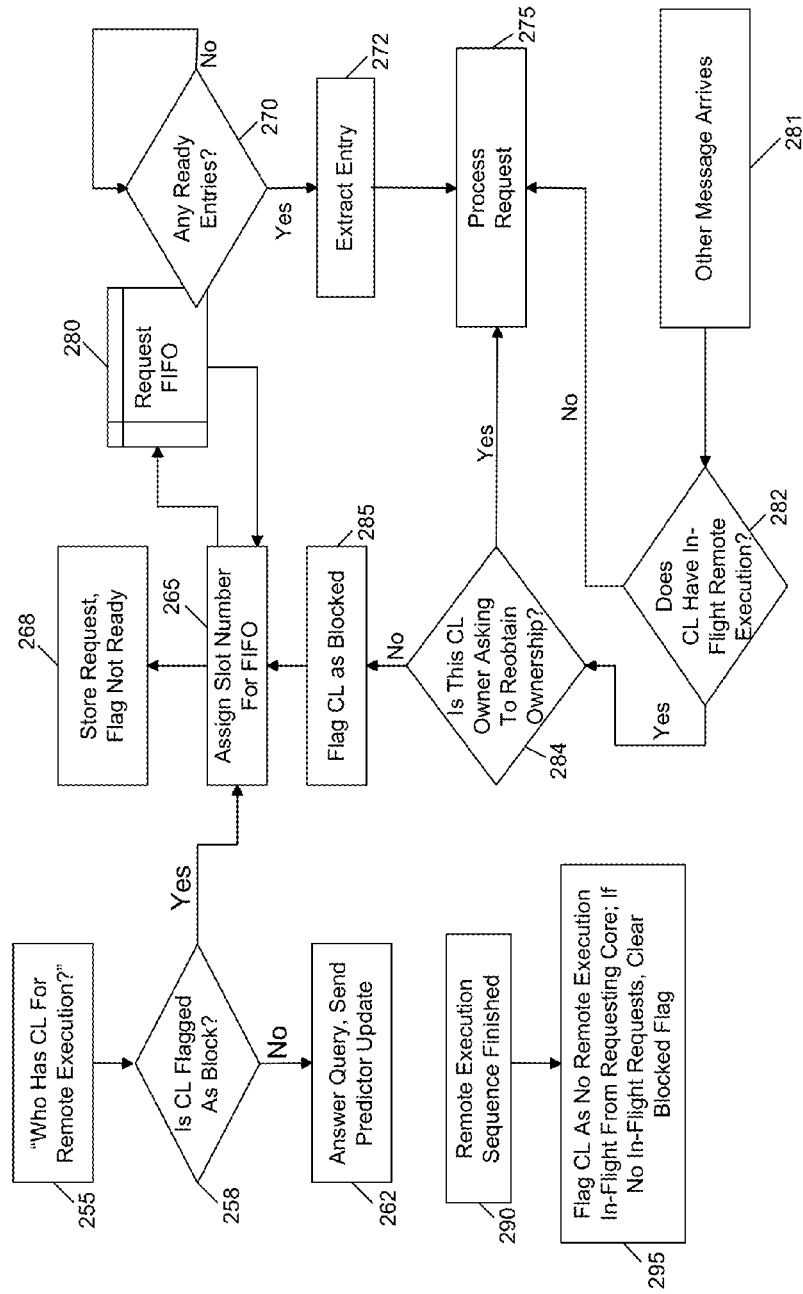
Figure 4E:
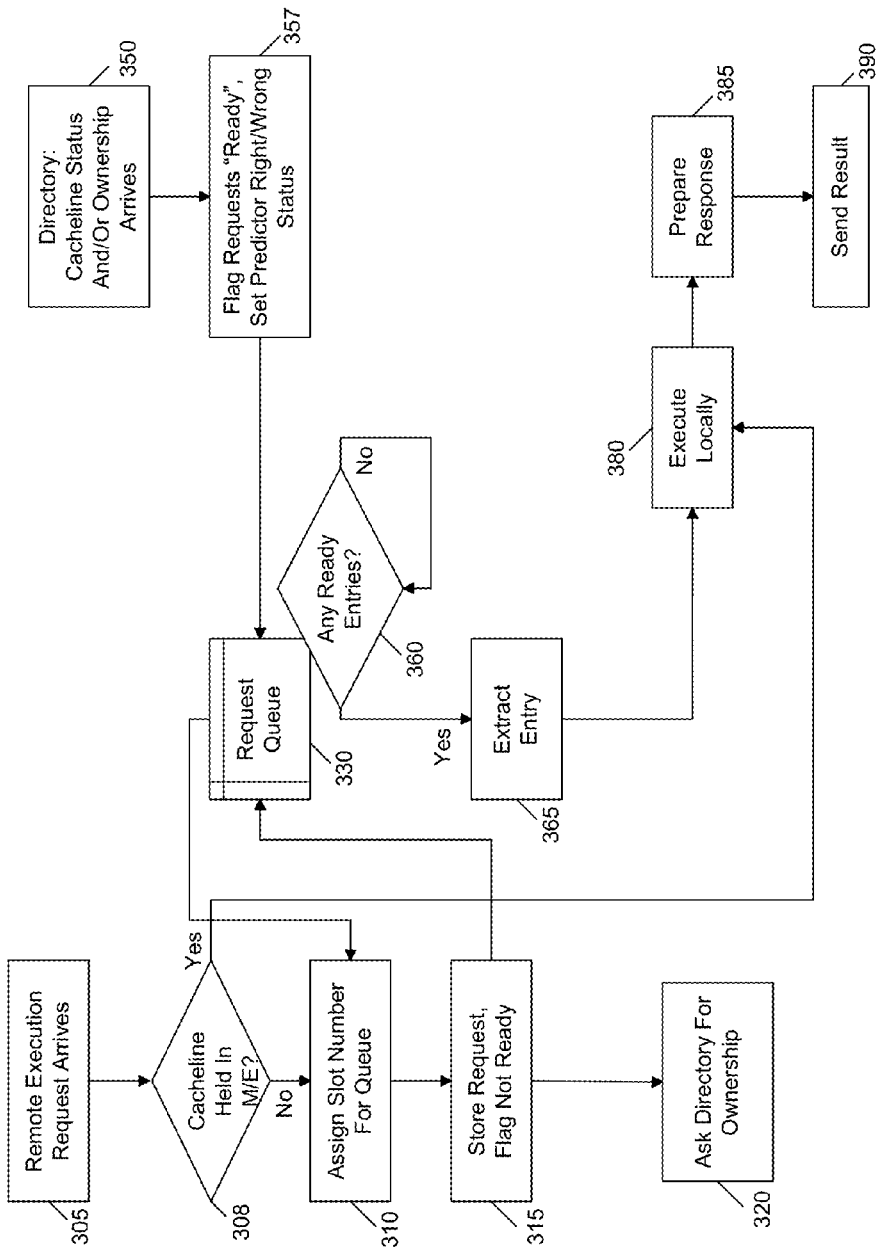

In yet other embodiments, remote execution may be handled by a current owning core of a cacheline associated with the request. FIGS. 4C-4E illustrate flow diagrams for handling such operations in the requesting core (FIG. 4C), the directory (FIG. 4D), and the owner core (FIG. 4E). As seen in FIG. 4C, method 302 may implement much of the operations set forth in FIG. 2 above with regard to handling a request for remote execution. As seen, when contention is predicted (diamond 140), the requesting core may marshal data (block 150), request the directory to determine who owns the cacheline and set a corresponding flag in a remote execution queue (block 152). Upon receipt of a message from the directory indicating the cacheline owner as well as a prediction update (block 175), it may be determined whether the requesting core has become the owner (diamond 178). If so, execution may occur locally (block 180). Otherwise, an entry in the remote execution queue may be loaded and a corresponding flag may be set (blocks 182 and 183). Accordingly at this point, the requesting core can issue the remote execution request to the owning core (block 155). Upon receipt of the results (block 160), the requesting core processes the results (block 165), clears the corresponding entry in the remote execution queue (block 168), and notifies the directory that remote execution is completed (block 170).

Referring now to FIG. 4D, shown is the flow for handling a remote execution request in the directory. A method 250 begins by receiving a message from the requesting core to determine the owner of the cacheline (block 255). It may be determined then if the cacheline is flagged as blocked (diamond 258). If not, the cacheline may be flagged as in flight for a remote execution request (block 260). Accordingly, the directory may answer the query and provide the owner information to the requesting core, along with a predictor update (block 262). If instead at diamond 258 it is determined that the cacheline is blocked, control passes to block 265 where a slot number may be assigned for the request in a request first-in first-out (FIFO) queue 280. Accordingly, the request is stored in the corresponding FIFO entry and flagged as not ready (block 268).

At a later time, the directory may determine whether any entries in the request FIFO are ready (diamond 270). If so, the entry may be extracted (block 272) and the request processed (block 275).

It is possible that during pendency of a remote execution request, another message arrives (block 281). The directory may then determine whether the cacheline has an in-flight remote execution request already pending (diamond 282). If not, the request may be processed (block 275). Otherwise, it may be determined whether the cacheline owner is asking to re-obtain ownership. If so, the request may be processed at block 275. Otherwise, the corresponding cacheline may be flagged as blocked (block 285), from where control passes to block 265.

When a remote execution sequence is finished at block 290, the directory may flag the cacheline as not having a remote execution request in-flight from the requesting core and if no other in-flight request is pending for that cacheline, the in-flight flag may be cleared (block 295).

Referring now to FIG. 4E, shown is a flow diagram of handling a remote execution request in an owner core in accordance with an embodiment of the present invention. As seen, method 303 may generally flow in a manner similar to that discussed above regarding FIGS. 4A and 4B. When a remote execution request arrives (block 305), it may be determined whether the cacheline is held in a modified/exclusive state (diamond 308). If so, the request may be executed locally, a response prepared and the result sent back to the requesting core (blocks 380, 385 and 390).

Otherwise if the cacheline is not held in a modified or exclusive state, control passes to block 310 where a slot in a request queue 330 may be assigned, the request is stored with a not ready flag (block 315), and a request is made to the directory for ownership (block 317). Upon receipt of a message from the directory providing the cacheline status and/or ownership (block 350), the corresponding request may be flagged as ready and the predictor status updated accordingly (block 357). Accordingly, this request is ready, and it may be extracted at block 365 for local execution. While shown with these particular operations in the embodiments of FIGS. 4A-4E, understand that remote execution in accordance with an embodiment of the present invention may be handled in other manners in different implementations.

Embodiments may be implemented in various multi-core processors. While the scope of the present invention is not limited in this regard, some embodiments may be implemented in a many-core processor where the number of cores can be greater than, for example, 16 or 32 or more such cores.

Figure 5:
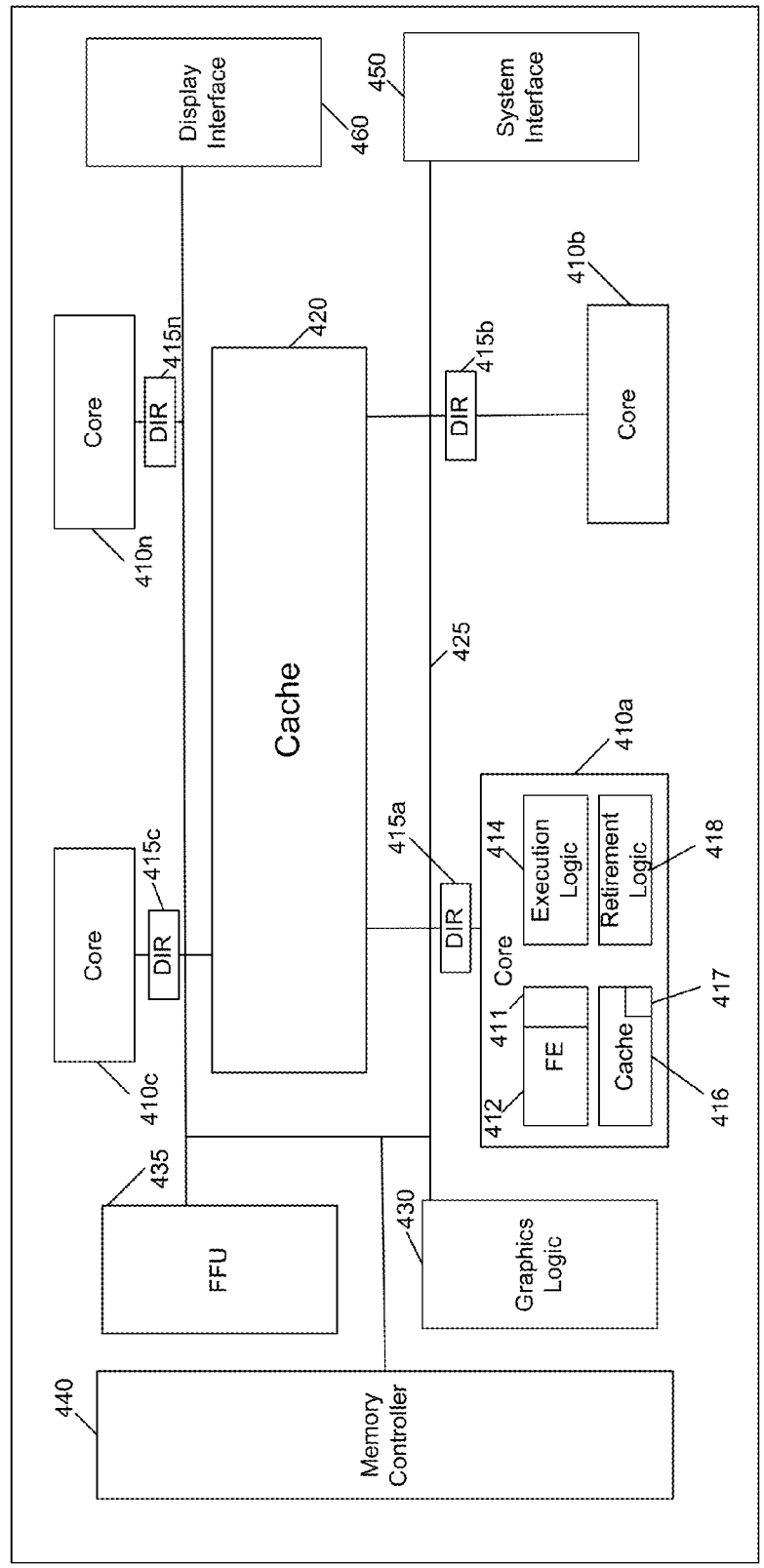
FIG. 5 is a block diagram of a processor in accordance with one embodiment of the present invention.

Referring now to FIG. 5, shown is a block diagram of a processor 400 in accordance with one embodiment of the present invention. As shown in FIG. 5, processor 400 may be a many-core processor including a plurality of cores $410_a$-$410_n$. In various embodiments, each core may be a multi-threaded wide single instruction multiple data (SIMD)-capable processor core having an out-of-order pipeline. An example of one such core $410_a$ is shown in further detail in FIG. 5. As seen, core $410_a$ includes a front end (FE) unit 412 that may be used to fetch instructions and prepare them for execution out of order in one or more execution units(s) 414, which may include various structures to perform different operations including arithmetic logic units (ALUs), floating point units and so forth. Note that FE unit 412 includes a logic 411 that may control performance of certain instructions, namely lock instructions, in different manners depending on a contention prediction. Such prediction may be provided by a predictor, e.g., a contention predictor in accordance with an embodiment of the present invention that is part of a cache memory 416. For example, cache 416 may be an on-die local cache and further which may be segmented into an instruction cache and a data cache, in some embodiments. Thus based on a prediction provided by predictor 417, logic 411 may cause a lock operation to be handled conventionally in execution unit 414, or may cause the same instruction to be sent to another core 410 or other location for proxy execution in accordance with an embodiment of the present invention when contention is predicted. As further seen in FIG. 5, core 410 further includes retirement logic 418 that may receive the results of various instructions handled in execution unit 414 and reorder them in program order. While shown with this high level view in the embodiment of FIG. 5, understand the scope of the present invention is not limited in this regard.

Referring still to FIG. 5, in addition to multiple cores, processor 400 may include an additional cache memory 420 such as a level two (L2) cache that provides for greater storage than available in the individual local caches of the various cores. As seen, the cores may be coupled together via a ring 425. In addition, coherency may be maintained using a distributed directory formed of a plurality of distributed directory portions $415_a$-$415_n$, each associated with a corresponding core. Of course, other components in processor 400 may also have distributed directory portions associated therewith.

To enable communication with a memory coupled to processor 400, a memory controller 440 may be provided. Furthermore, to provide an interface to various system components, a system interface 450 may be present which, in one embodiment may provide for a point-to-point connection, although the scope of the present invention is not limited in this regard. Furthermore, a display interface 460 provides a direct link from processor 400 to an attached display which may be a display of a computer system, a handheld device, mobile terminal or the like. In the embodiment shown in FIG. 5, processor 400 may further include additional dedicated logic units for handling certain operations. For example, a fixed function unit 435 may be tasked to perform particular operations such as specialized graphics or physics processing. Similarly, a graphics logic 430 may perform specialized graphics functions such as texturing, although other operations are possible. While shown in the embodiment of FIG. 5 as being a multi-core processor with on-chip cache and directory, the scope of the present invention is not limited in this regard and other embodiments may be used with a system having multiple processors each with one or more cores and a directory that is implemented in another manner, e.g., via a dedicated directory or a distributed directory. Still further, embodiments may be implemented in systems that do not use a directory mechanism and instead maintain coherency using a snoop-based system.

Embodiments may thus facilitate better management of contention in a manner that dynamically adjusts to any given micro-architecture implementation. No additional programmer burden is required, nor are any toolchain support issues created. That is, there is no need for a programmer, compiler or any other entity to analyze the program or its behavior to determine whether a lock operation is likely to be contended and predetermine an execution behavior for such operation. Instead, embodiments may dynamically determine during instruction decode whether contention is present and based on a prediction of such contention dynamically select from multiple execution behaviors. Thus there is no need for new instructions or special prefix flags on normal instructions, i.e., a second set of instructions in an ISA (such as an "atomic_inc" operation) to be executed for contended locks.

Figure 6:
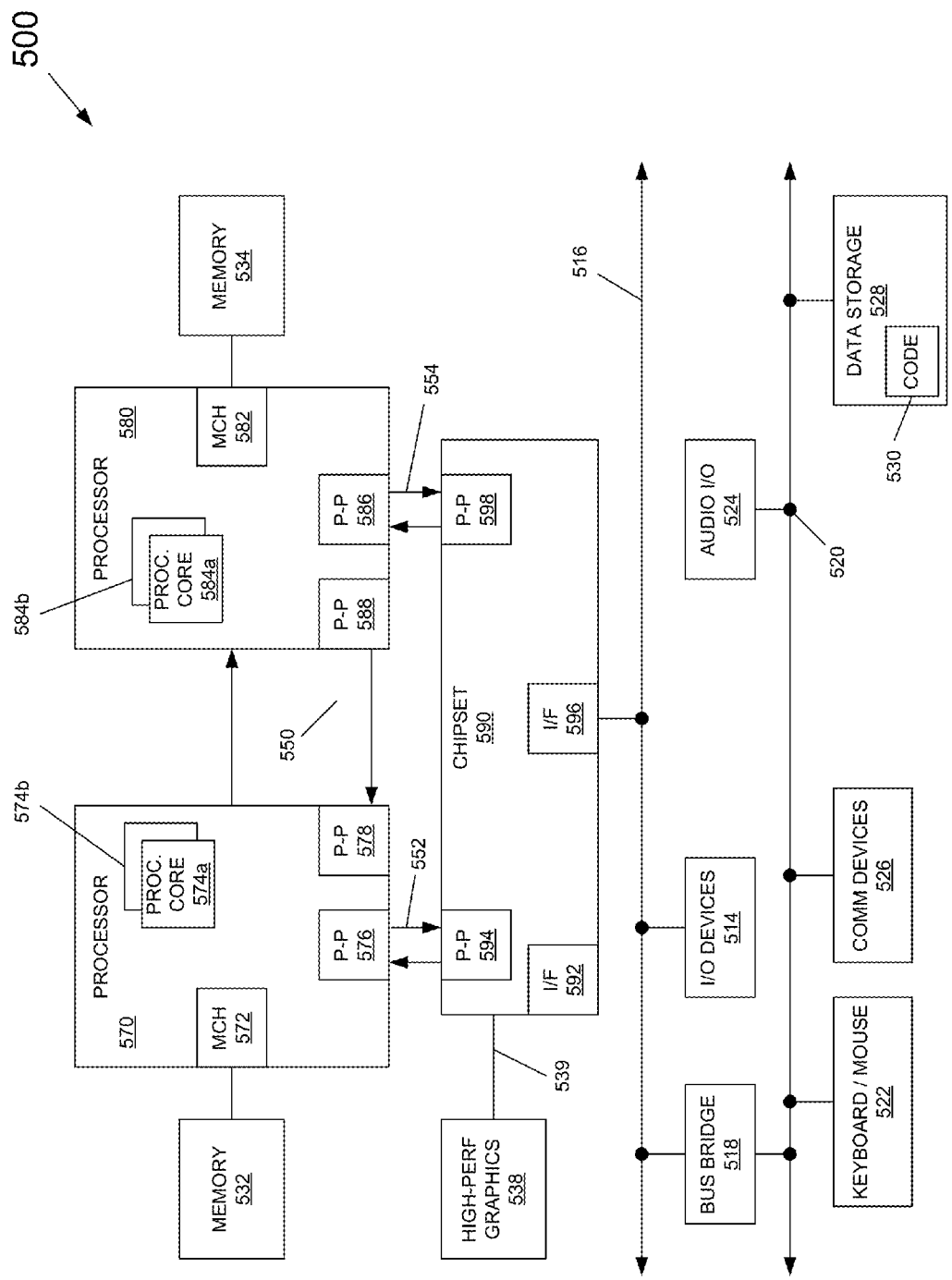
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), although potentially many more cores may be present in the processors. The processor cores may execute various threads and may dynamically handle certain instructions with different behaviors, based on a prediction of contention associated with the instructions.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a first instruction for decoding in a first core of a processor and determining whether contention is predicted with respect to the first instruction; and
   if no contention is predicted executing the first instruction in the first core, and if contention is predicted obtaining data associated with the first instruction in the first core and sending a remote execution request with the obtained data to a selected remote agent for execution of the first instruction, the prediction based at least in part on whether a contention vector of an entry of a directory associated with the obtained data indicates that a plurality of cores sought to atomically access the obtained data during a historical window including a first time period and a second time period, the contention vector having a plurality of core fields each associated with a core, each core field including a first indicator to indicate access of a cacheline via an atomic operation by the associated core within the first time period and a second indicator to indicate access of the cacheline via an atomic operation by the associated core within the second time period.

2. The method of claim 1, wherein execution of the first instruction in the first core or the selected remote agent is transparent to a user and an operating system.

3. The method of claim 1, further comprising determining whether to execute the first instruction in the first core or the selected remote agent at decode of the first instruction based on the prediction.

4. The method of claim 1, further comprising ignoring the contention prediction if the first instruction is not of a selected type.

5. The method of claim 4, further comprising sending a request from the first core to the directory to determine an owner of the obtained data associated with the first instruction, the request to indicate to the directory that the first core is to request the remote execution, wherein the directory is to update an entry of the directory associated with the obtained data to indicate access of the data by the first core and to update an in-flight indicator to denote that the remote execution request is pending.

6. The method of claim 5, further comprising receiving a message from the directory in the first core to indicate an owner core for the obtained data.

7. The method of claim 6, further comprising sending the remote execution request to the owner core for the obtained data from the first core, responsive to the message from the directory.

8. The method of claim 5, wherein updating the directory entry comprises setting, in the contention vector, the first indicator of the core field associated with the first core to indicate access of the obtained data via the atomic operation.

9. The method of claim 8, wherein when a timer expires, determining in the directory whether a plurality of indicators of core fields of the contention vector are set and if so, updating a prediction feedback value to reflect contention.

10. The method of claim 9, further comprising receiving in the first core a result of the remote execution request and an update for the prediction, and updating an entry of a predictor of the first core corresponding to the first instruction with the update.

11. A processor comprising:
    a plurality of cores, each of the cores including:
      a front end to decode an instruction and to cause the instruction to be executed in an execution logic of the core if no contention is predicted, and if contention is predicted, to cause the instruction to be sent with data associated with the instruction to a selected remote agent for execution of the instruction; and
      a predictor having a plurality of entries each to store a prediction as to whether an instruction associated with the entry is to be contended during execution; and
    a directory having a plurality of entries each to store tag information regarding a cacheline present in one or more cores of the processor, each entry further including a contention vector having a plurality of core fields each associated with a core, each core field including a first indicator and a second indicator each to indicate access of the cacheline via an atomic operation by the associated core within a time period.

12. The processor of claim 11, wherein each directory entry further includes a tag portion to store an in-flight indicator to indicate that a remote execution request associated with the cacheline is pending.

13. The processor of claim 11, wherein a first core of the plurality of cores is to send a first message to the directory to determine an owner of the data associated with the instruction and to indicate that the first core is to request a remote execution.

14. The processor of claim 13, wherein the first core is, responsive to receipt of a response message from the directory, to send a second message to an owner of the data, the second message including the remote execution request and the data.

15. The processor of claim 14, wherein the first core is to receive a result of the remote execution request and an update for the prediction, and update an entry of the predictor corresponding to the instruction with the update.

16. The processor of claim 11, wherein the selected remote agent is a memory controller of the multi-core processor, the memory controller including an execution logic.

17. A system comprising:

a processor having a front end to decode an instruction and determine whether contention is predicted with respect to the instruction, a dynamic execution logic to execute the instruction if no contention is predicted and otherwise to obtain data associated with the instruction and send a remote execution request with the obtained data to a selected remote agent for execution of the instruction, and a predictor having a plurality of entries each to store a prediction as to whether an instruction associated with the entry is to be contended during execution;

a directory having a plurality of entries each to store tag information regarding a cacheline stored in a cache of the system, each entry further including a contention vector having a plurality of core fields each associated with a core, each core field including a first indicator and a second indicator each to indicate access of the cacheline via an atomic operation by the associated core within a time period; and a dynamic random access memory (DRAM) coupled to the directory and the processor.

18. The system of claim 17, wherein the processor is to send a first message to the directory to determine an owner of the obtained data associated with the instruction and to indicate that the processor is to request a remote execution.

19. The system of claim 18, wherein the processor, responsive to receipt of a response message from the directory, is to send a second message to the selected remote agent corresponding to an owner of the obtained data, the second message including the remote execution request and the obtained data, and wherein the processor is to receive a result of the remote execution request and an update for the prediction, and update an entry of the predictor corresponding to the instruction with the update.

20. The system of claim 17, wherein the processor comprises a multicore processor including a plurality of cores, the directory, and a shared cache memory coupled to the directory.

* * * * *